Jan. 4, 1949.       R. P. VAN ZANDT        2,457,942
GEAR CONSTRUCTION AND ARRANGEMENT
Filed April 16, 1947
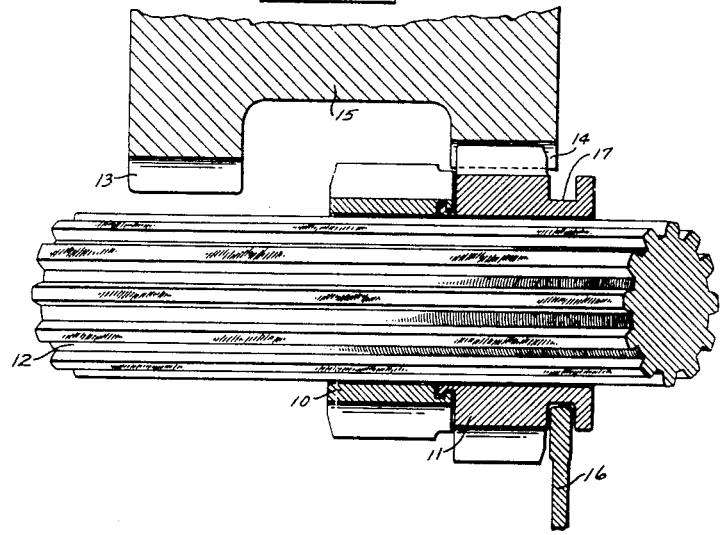
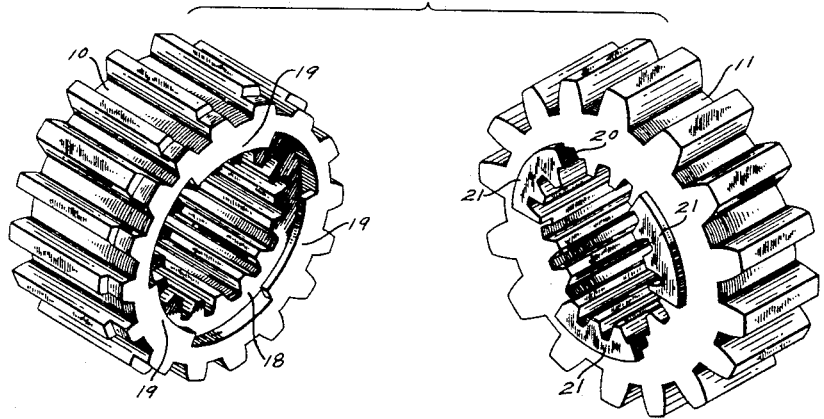
INVENTOR.
Rollin P. Van Zandt
BY
Charles M. Fryer
ATTORNEY.

Patented Jan. 4, 1949

2,457,942

UNITED STATES PATENT OFFICE 2,457,942

GEAR CONSTRUCTION AND ARRANGEMENT

Rollin P. Van Zandt, Peoria, Ill., assignor to Caterpillar Tractor Co., San Leandro, Calif., a corporation of California Application April 16, 1947, Serial No. 741,818

2 Claims. (Cl. 74—432)

This invention relates to gears and particularly to the construction and arrangement of so-called cluster gears commonly used in gear type transmissions and the like.

A cluster gear may comprise two or more gear like forms cut from a single piece of metal. The two gear forms are different pitch diameter but have a common axis and a single bore for reception of a shaft. In transmissions the bore is usually splined and fitted for sliding movement on a splined shaft. Sliding of the gear along the shaft affects selective registration of its two parts with other gears for varying the driving ratio through the transmission. Thus, the cluster gear has a width and a bore length equal to two gears while only one of its gear parts is meshed at a time. The driving torque transmitted through the gear is, therefore, always applied to one end or the other with the result that the gear tends to skew or cock on the shaft. Cocking of the gear results in misalignment of its meshing teeth and unequal loading and excessive wear takes place.

Another disadvantage of the conventional cluster gear is the difficulty encountered in manufacture because one of its gear forms is smaller than the other. The gear teeth on the smaller part terminate adjacent the wall or shoulder formed by the larger part and must, therefore, be cut by a shaping cutter method rather than the faster and more efficient method of hobbing.

An object of the present invention is to provide a construction and arrangement for cluster gears to overcome the above disadvantages and to form such a gear in two separable parts connected by relative rotation but locked against separation in an axial direction. A further object is to provide a cluster gear in which driving torque applied to either of its gear parts is transmitted through that part only so that balanced loading between the driving connection of the gear and the shaft upon which it is mounted is maintained. Still further objects and advantages of the invention are made apparent in the following specification wherein reference is made to the accompanying drawings.

In the drawings:

Fig. 1 is a central vertical sectional view of a cluster gear arrangement embodying the present invention and illustrated in the environment of a transmission, fragmentary parts of which are also shown; and Fig. 2 is an isometric view of the two parts of the cluster gear in separated relation illustrating connecting means on both parts.

Referring to the drawings in detail, the cluster gear of the present invention is illustrated as made of a small gear part 10 and a large gear part 11. Each of the two gear parts is formed with a splined bore as best shown in Fig. 2 for reception by a splined shaft 12 which in the present illustration may represent the driven shaft of a gear type transmission of conventional construction. The gear parts 10 and 11 are interconnected at their abutting faces by means presently to be described in a manner to cause them to move together as they slide axially on the splined shaft 12. A driving gear 13 of large diameter and a driving gear 14 of relatively smaller diameter are formed integrally with a common hub 15 and are driven by means not shown. By sliding the cluster gear along the shaft 12, its larger gear part 11 may be meshed with the smaller driving gear 14 as shown in Fig. 1 or its smaller gear part 10 may be meshed with the larger driving gear 13 to vary the ratio of drive through the transmission, as is common practice. Gear shifting mechanism, not shown, is usually employed for imparting this sliding movement to the cluster gear and this shifting mechanism may include a fork, a part of which is illustrated at 16 in Fig. 1, received in an annular groove 17 in the cluster gear to move the gear axially along the shaft without interfering with its rotation.

Because of necessity of the cluster gear sliding freely on the splined shaft 12, there is considerable tolerance or play in the splined connection and when the gears are rotating there is a tendency for the driving gear to cock the cluster gear relative to the splined shaft. Thus, the driving force is unbalanced or unequally distributed and the engagement between the teeth of the driving gear and the driven cluster gear is not continuous throughout the full length of the tooth, as is desirable. This effects uneven wear of the teeth of both gears and results in rapid deterioration and unsatisfactory operation.

According to the present invention, the two gear parts 10 and 11 of the cluster gear are formed as separate gears rather than integrally as a single part in the conventional manner. The separate gears 10 and 11 are adapted to be connected together at their abutting faces by means best illustrated in Fig. 2. The gear part 10 is shown as provided with an undercut groove 18 to form a radially inwardly projecting flange cut away in three parts to provide three radially inwardly projecting lugs 19. The gear 11 has on its abutting face, and adjacent its centrally splined bore, spaced axial projections 20, each provided with a radially outwardly projecting lug 21. The lugs 21 correspond in number and position with the lugs 19 on the gear 10 and also correspond in number and spacing with the spaces between the lugs 19 on the gear 10. Consequently, in bringing the gears 10 and 11 together in face to face relationship, the lugs 21 will enter the undercut groove 18 in the gear 10 through the spaces between the lugs 19. Then upon partial relative rotation of the gear parts 10 and 11, the lugs 21 will be disposed behind the lugs 19 and endwise or axial separation of the gears is prevented. Three sets of interengaging lugs 19 and 21 are shown but any desired number of such lugs may, of course, be employed.

The gears 10 and 11 assembled in this manner provide a cluster gear that may be slipped onto the splined shaft 12 and because of the splined connection between each gear part and the shaft, their rotation on the shaft and therefore their rotation with relation to each other is prevented. Consequently, it is impossible for the gear parts 10 and 11 to be separated from each other axially after they have been locked together and mounted on a shaft. Each gear part is, however, capable of independent rotation to the extent permitted by the tolerance in its splined connection with the shaft. Thus, when the driving gear 14 of Fig. 1 is driving the gear part 11, the gear part 10 is not rigidly fixed to the part 11 and the load transmitted from the gear 14 to the gear 11 is centered or balanced and does not tend to cock the cluster gear with relation to the shaft. The same condition prevails in the other gear position when the driving gear 13 meshes with the cluster gear part 10 as at this time the cluster gear part 11 is free and is not affected by forces transmitted through the gear 10 to the splined shaft 12. Because of the construction illustrated, the separate gears 10 and 11 which make up the cluster gear may be formed by the simplest gear cutting operation and are, therefore, less costly and simpler to manufacture than conventional types of cluster gears.

I claim:

1. A cluster gear adapted to be mounted on a splined shaft comprising, separate gear parts having splined bores for reception of the shaft, and means for connecting said gear parts together including lugs on each gear part interengageable upon relative rotation of the parts to secure them against axial separation whereby the splined connection of the parts on the shaft will prevent their separation.

2. A cluster gear comprising two gear like parts having interengageable lugs adapted to connect the parts for relative rotation but to prevent axial separation thereof, said lugs being engageable and disengageable by relative rotation of the gear parts, and splined bores in the parts for assembly on a splined shaft to cause them to rotate with the shaft and to lock them against relative rotation after they are assembled.

ROLLIN P. VAN ZANDT.

REFERENCES CITED

The following references are of record in the file of this patent:

UNITED STATES PATENTS

| Number | Name | Date |
| --- | --- | --- |
| 871,677 | Dawes | Nov. 19, 1907 |
| 1,724,822 | Brown | Aug. 13, 1929 |
| 1,943,266 | Condron | Jan. 9, 1934 |
| 1,993,729 | Brouwer | Mar. 12, 1935 |
| 1,731,151 | Royce | Oct. 8, 1929 |